United States Patent [19]

Graham et al.

[11] 3,896,934
[45] July 29, 1975

[54] FREE FLOW, INTERLOCKING PACKING MATERIAL OF LOW BULK DENSITY

[75] Inventors: Arthur Graham, Palo Alto, Calif.;
Alexander G. Makowski, Wilmington, Del.; Gunter G. Fuss, Daly City, Calif.

[73] Assignee: Free-Flow Packaging Corporation, Redwood City, Calif.

[22] Filed: Nov. 24, 1972
(Under Rule 47)

[21] Appl. No.: 309,459

Related U.S. Application Data

[63] Continuation-in-part of Ser. No. 82,697, Oct. 21, 1970, abandoned, which is a continuation-in-part of Ser. No. 815,302, April 11, 1969, abandoned.

[52] U.S. Cl. ............... 206/523; 161/168; 217/53; 229/14 C
[51] Int. Cl. ..................... B65d 81/12; B65d 85/30
[58] Field of Search........... 206/523, 521; 229/14 C; 217/53; 138/178; 100/9; 161/168

[56] References Cited
UNITED STATES PATENTS

| | | | |
|---|---|---|---|
| 2,649,958 | 8/1953 | Rausch ............................... | 217/52 |
| 3,481,455 | 12/1969 | Graham ............................ | 229/14 C |
| 3,565,243 | 2/1971 | Freeman............................. | 217/53 |
| 3,572,396 | 3/1971 | Hoffman et al..................... | 138/178 |

*Primary Examiner*—William T. Dixson, Jr.
*Attorney, Agent, or Firm*—Flehr, Hohbach, Test, Albritton & Herbert

[57] ABSTRACT

A free flowing packing material particularly characterized by its ability to interlock to prevent migration of packed items within the material, together with a method and means for its manufacture. Individual units of the packing material are essentially in the form of peripherally bonded or united plastic units which (originally of cylindrical or annular shape) are expanded and curled to form essentially hollow configurations of a particular form, which when viewed in side elevation resemble a fleur de lis, and when viewed in end view, the Greek letter $\theta$ or the number 9. The individual units are of a size and shape to provide the desired free flowing characteristic, and in final form are composed of a foamed expanded crushable plastic material which provides a desired shock absorbing capability. The characteristically curled annular portions of the individual units provide an additional shock absorbing capacity due to an inherent ability of inward and lateral collapse. Through bonding or joining of such curled annular portions to a central annular core, outwardly facing wedge-shaped recesses are provided which interlock in a packing mass with similar wedge-shaped recesses in adjacent units to provide the desired resistance to "migration" of a packed items through the packing material. The packing units are also substantially uniform in external or spacial dimension, and as a result are highly resistant in a packing mass to settling or self-packing within a shipping container, thereby further enhancing both shock absorbing and migration resisting characteristics.

14 Claims, 23 Drawing Figures

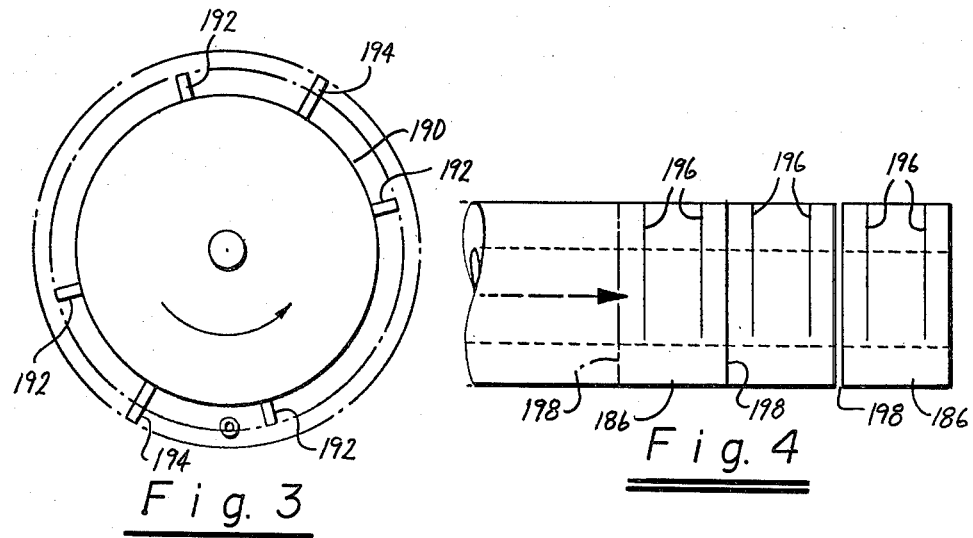
Fig. 3
Fig. 4
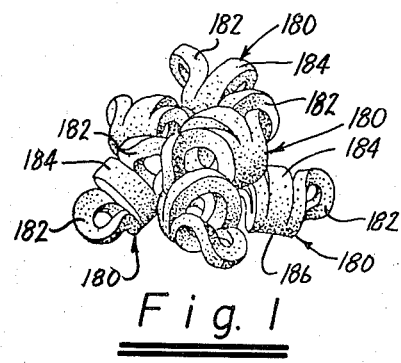
Fig. 1
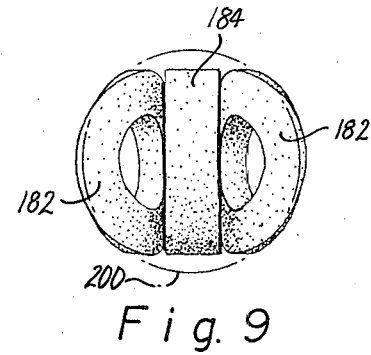
Fig. 9
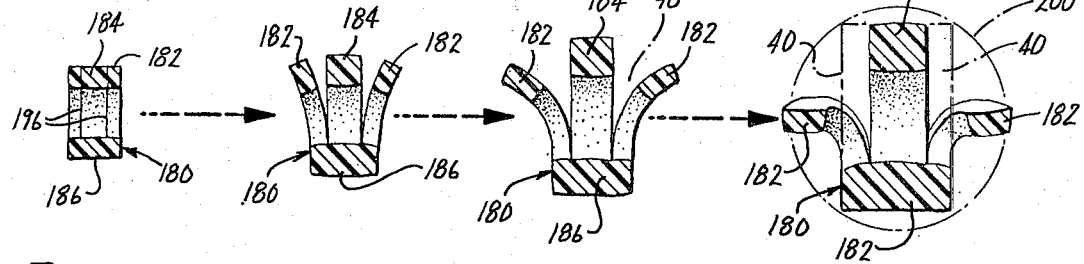
Fig. 5   Fig. 6   Fig. 7   Fig. 8

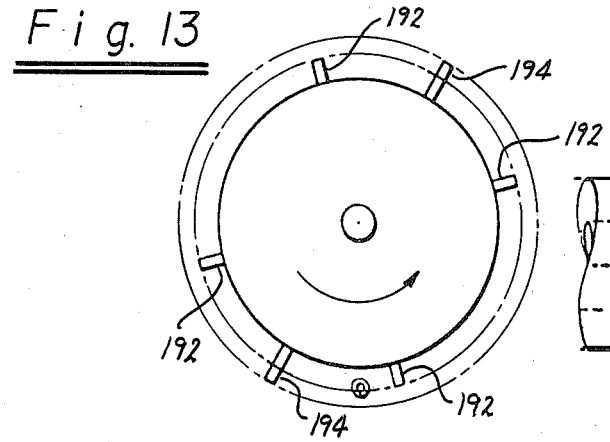
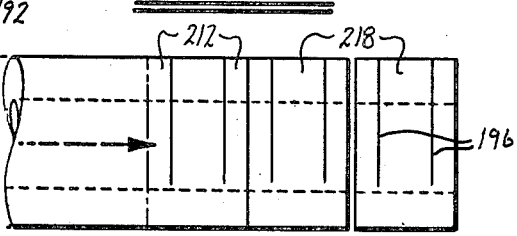
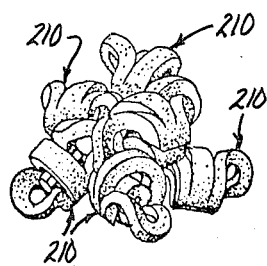
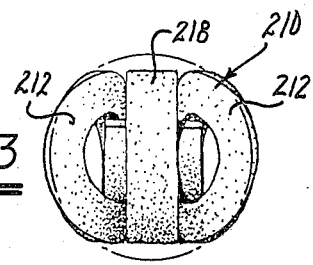
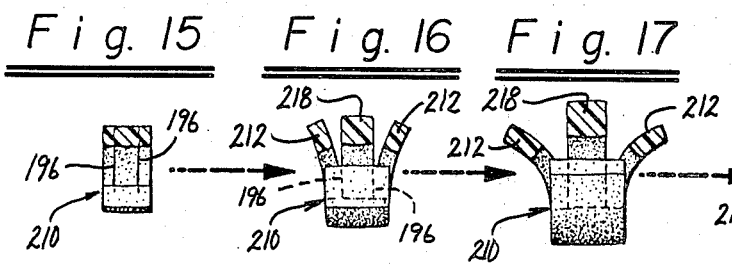
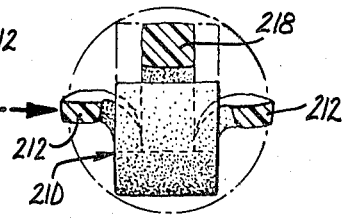
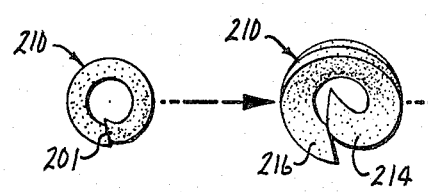
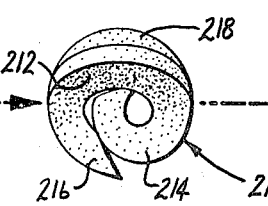
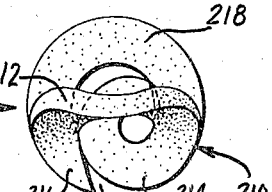

3,896,934

FREE FLOW, INTERLOCKING PACKING MATERIAL OF LOW BULK DENSITY

CROSS REFERENCE TO RELATED APPLICATIONS

This application is a continuation-in-part of copending application Ser. No. 82,697, filed Oct. 21, 1970 by Arthur Graham, Alexander G. Makowski, and Gunter G. Fuss, now abandoned which was a continuation-in-part of the parent application Ser. No. 815,302, filed Apr. 11, 1969, entitled FREE FLOW INTERLOCKING PACKAGING MATERIAL OF LOW BULK DENSITY, now abandoned.

This application relates generally to packing materials, and to methods and means for producing packing materials of the type disclosed in Graham, et al., U.S. Pat. No. 3,481,455, and copending application Ser. No. 765,083, filed Oct. 4, 1968 by Alexander G. Mackowski, now abandoned.

BACKGROUND OF INVENTION

This invention relates generally to free flowing, loose fill packing materials, such as are used in the storage and shipment of frangible items of merchandise, to methods and means for their production, and more particularly to an improved interlocking form of packing materials of this type made of foamed, expanded plastic.

It is a known fact that conventional procedures for packing fragile or breakable items of merchandise have not always been successful in preventing damage, even though carried out with great care by professional shippers or packers. Thus prior to the development of the packing materials referred to in the above copending application, it was generally considered impossible to substantially reduce or eliminate braakage due to rough handling of the shipping cartons, road shocks, impacts and the like. One difficulty particularly encountered in the handling or shipping of extremely delicate but relatively heavy equipment, such as electronic or optical equipment, has been "migration" of the item through the packing material due to continuous vibration during handling. For example, in shipments in a van or rail car, migration of the packed item will frequently continue until contact is made with the wall of the shipping carton, and breakage occurs. In the past, breakage from this cause alone has been a matter of sufficient concern to necessitate extra precautions in the packing of particular items, at considerable added expense. However, even these added precautions have frequently proved ineffective in preventing breakage, which customarily may run as hish as 15 precent of the items being shipped.

SUMMARY OF INVENTION AND OBJECTS

Generally stated, the present invention is directed to a free flow, interlocking packing unit in the form of a substantially hollow shape-retaining, characteristically shaped unit made of foamed expanded plastic, having an annular core and curled expanded annular members joined thereto to provide wedge-shaped openings in the walls of the same to facilitate the interlocking function. The present invention is also directed to a method and means for the continuous manufacture of free flow, interlocking packing units of the type described. The method generally involves successive steps of heating an expandable plastic material to a plastic or heat-softened stage, continuously extruding the heat-softened plastic material in the form of a cylinder or hollow tube, and then slicing and cutting the extruded tube into individual units having wedge-forming cuts formed between outer annular portions and the aforementioned annular core, so that such outer portions are secured to the core and to one another at a peripheral portion of the tube. In a prefered embodiment of the invention, the extruded heat-softened tube is longitudinally stretched while in a heat-softened state and then sliced and cut to facilitate subsequent heat expansion of the adjacent annular portions of the individual packing units to provide the characteristically shaped units of the invention. In general, the effect of subsequent expansion (which occurs in a substantially radial direction due to longitudinal stretching of gas cells within the walls of the longitudinally stretched tubes or units) is to cause a characteristic outward curling of the outer annular portions as respects the central core.

It is an object of the present invention, therefore, to provide free flowing, interlocking packing materials comprising foamed expanded units of the type described.

Another object of the invention is to provide novel foamed expanded units of the character described wherein a tubular foamed structure is initially stretched in a longitudinal direction, and then sliced and cut in such fashion as to facilitate a desired outward curling expansion of outer annular portions of such units.

Another object of the invention is to provide a novel method for continuously forming substantially hollow self-supporting packing units of the type described.

Still another object of the invention is to provide a method and means for making foamed expanded packing units of the character described which is readily adapted to machine-type production line techniques.

A further object of the invention is to provide a novel method for the manufacture of foamed, curled and expanded packing units having the free flowing, interlocking characteristic described.

Additional objects and advantages of the present invention will appear from the following description in which preferred embodiments have been set forth in detail in conjunction with the accompanying drawing.

BRIEF DESCRIPTION OF THE DRAWING

FIG. 1 is a view in perspective of a quantity of packing material embodying the invention.

FIG. 3 is an enlarged schematic representation of modified apparatus, illustrating slicing and serving means useful in the apparatus of FIG. 2 to produce the embodiments of the packing material shown in FIG. 1.

FIG. 4 is a schematic representation of slicing and severing operations as performed by the apparatus of FIG. 3.

FIGS. 5 through 8 are enlarged sectional views illustrating various sequential stages in the formation of expanded curled packing units of the type illustrated in FIG. 1.

FIG. 9 is an enlarged top plan view of a final form of the foamed expanded and curled packing units of FIG. 1, as also shown in FIG. 8.

FIG. 10 is a view in perspective, similar to FIG. 1, illustrating another embodiment of packing material according to the invention.

FIG. 13 is an enlarged schematic representation of a portion of the apparatus, similar to FIG. 3, illustrating slicing and severing means useful in producing packing units of the type shown in FIG. 10.

FIG. 14 is a schematic representation of slicing and severing operations as performed by the apparatus of FIG. 13.

FIGS. 15 through 18 are enlarged sectional views illustrating various sequential stages in the formation of the packing units illustrated in FIG. 10.

FIGS. 19 through 22 are enlarged end views, respectively, of the packing units shown in FIGS. 15 through 18.

FIG. 23 is an enlarged top plan view of a final form of the foamed expanded and curled packing units of FIG. 10, as also shown in FIGS. 18 and 22.

DESCRIPTION OF PREFERRED EMBODIMENTS

Figure 2:
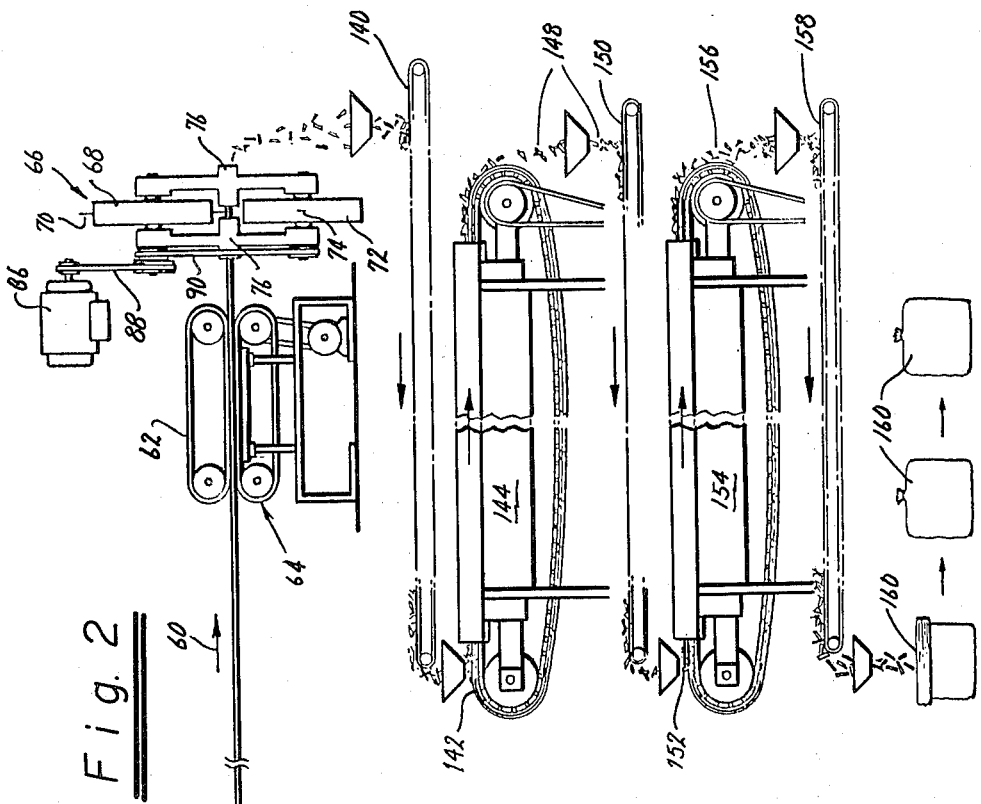
FIG. 2 is a schematic representation of a system of apparatus for carrying out the method of the present invention, and to produce the packing material of FIG. 1.

Referring to the drawings in detail, FIGS. 1 and 8 illustrate one embodiment of the improved packing materials wherein the individual units are designated by the reference character 180. In this embodiment, each packing unit 180 consists of a pair of foamed expanded and curled outer annular portions 182 substantially permanently bonded or secured to a central foamed expanded annular core 184 and to one another at a peripheral portion 186. A further embodiment of the improved packing material, illustrated in FIGS. 10, 18, 22 and 23, comprises an embodiment 210 of the packing material wherein the foamed expanded and curled outer annular portions 212 are secured to an inner annular core 218 having radially curled portions 214 and 216 as part of the core structure.

It will be noted that, in side elevation, adjacent annular partions of the packing units are at all times separated from one another by generally wedge-shaped openings, represented at 40. As will hereinafter be explained, these wedge-shaped openings promote a relatively high degree of interlocking between adjacent packing units in a packing mass to thereby not only provide a relatively firm cushioning support but also an unusual degree of resistance to migration of a packed item through the packing mass. However, suprisingly, the wedge-shaped openings 40 do not prevent or interfere with a desired "flowability" of the packing mass which permits the packing units to be individually poured into recesses and openings of oddly shaped items, and within the confines of a shipping carton. In commercial practice, pouring or filling operations of the type described can be performed rapidly and efficiently with automatic machinery, or by means of unskilled hand labor.

In accordance with the present invention, the units of packing material generally represented by the embodiments shown in FIGS. 1 and 8, and in FIGS. 10, 18, 22 and 23, are formed of a foamed expanded plastic of sufficient internal strength to be shaped-retaining during normal handling, but capable of deforming or crushing in response to damaging shocks or continued vibration. In the preferred embodiment described, the foam is characterized by an essentially cellular structure (unicellular or interconnecting) having a volume of cells or void spaces ranging from about 25 percent to as much as 85 percent of the total volume of the units. When an appropriate resin is selected to make the expanded plastic foam, the described highly porous foam structure possesses both a desired initial stiffness and resilience and an essential characteristic of crushability provided by the void spaces within the expanded foam, which imparts a latent crushability or shock absorbing characteristic to interior portions of the plastic material itself. This characteristic of crushability is additive to an inherent ability to deform or crush incorporated into the characteristic hollow "fleur de lis" configurations of the packing units of the present invention. It will be appreciated that the annular curled segments of the packing units, as well as the packing units themselves, possess an initial tendency to remain in an uncollapsed condition or shape, but, also, possess a latent capacity for deformation or crushing in the presence of damaging shocks or continued vibration.

Expanded plastic foams particularly suited for use in the present invention include both thermoplastic and thermosetting resinous materials. Thermoplastic resins capable of being foamed and expanded include specifically the alkenyl, aromatic polymers as disclosed in U.S. Pat. No. 3,066,382, and the aliphatic olefin polymers as disclosed in U.S. Pat. No. 3,251,728. These thermoplastic materials (in either modified or unmodified form) are customarily employed in conjunction with suitable foaming and nucleating agents. Thermosetting resins adapted for use in the present invention include foamed polyester resins such as the polyurethane foams (i.e., derived from isocyanate resins) and specifically the more rigid polyurethane foams made from relatively highly branched resins. Blowing or foaming agents are also advantageously used with the thermosetting resins. However, in the polymer-foaming reactions with the polyurethane resins, foaming also occurs through reaction of water with the isocyanate groups to cause cross linking and curing and production of carbon dioxide so that reduced amounts of such agents may be required.

Regardless of the particular plastic material employed, it is essential in carrying out the present invention that the packing units, in their foamed expanded state, possess the desired cellular structure and the desired proportion of void spaces with respect to the total volume, Thus, as will appear, the formulation of the plastic materials should be very carefully controlled to provide foamed expanded plastics of desired essential characteristics, for example: to provide desired cell sizes (i.e., ranging from 0.001 to 0.1 inch), to provide a desired proportion of void spaces to the total volume (i.e., ranging from at least 25 percent to no more than 85 percent), to provide a desired foam density (i.e., ranging from about 0.3 to about 4.5 pounds per cubic foot), to provide desired characteristics of resilience or shape retention to both the foam structure and the cylindrically shaped units of packing material, under normal handling, to provide both the foam and units with the "crushability" necessary to absorb forces or impacts capable of damaging a packed item and to provide other essential characteristics as hereinafter specified.

In one procedure adapted to the present invention, elongated plastic tubes are extruded through an extrusion device which effects an initial chemical expansion of expandable thermoplastic extrusion mass. Such an extrusion device is schematically illustrated at 50 in FIG. 2 wherein the extruder head is represented at 52. In general, the extrusion apparatus including the extruder head 52 is employed in conjunction with conventional auxiliary equipment including a hopper 54 and feed chamber 56 which are adapted to cooperate with an extruder screw or other pressure device (not shown) which forces a liquid or heat-softened plastic mixture through an annular passage or extrusion outlet as a substantially hollow elongated plastic tube. On particularly satisfactory method and apparatus for producing elongated hollow plastic tubes in this fashion is specifically disclosed in copending application Ser. No. 765,083, filed Oct. 4, 1968, in the name of Alexander G. Makowski, now abandoned. As therein disclosed, elongate hollow tubes of foamed expanded plastic are continuously extruded from the extrusion apparatus, as represented by the elongate tube 58 in FIG. 2 (also FIG. 11). In the ambient atmosphere, the heat-softened plastic material forced through the annular or circular extrusion orifice, quickly cools to a set stage, thereby facilitating frictional engagement and pulling of the tube away from the extrusion apparatus, as represented by the arrow 60. As particularly disclosed in the aforementioned copending application, Ser. No. 765,083, the tube 58 is pulled away from the extrusion apparatus at a rate appreciably faster than the heat-softened plastic material is extruded from the extrusion apparatus, the effect being to longitudinally stretch the heat-softened material to thereby longitudinally orient gas pockets and void spaces (cells) formed within the walls of the tube 58. As will hereinafter be explained in detail, such longitudinal orientation of the cells provides an expansion capability to severed sections of the tube 58 so that upon subsequent heating of the thermoplastic material, the expansion is substantially greater in a radial direction than along the axes of the severed units.

As particularly illustrated in FIG. 2, the elongate tube 58 is frictionally engaged by endless belts or other friction devices 62 forming part of a pulling mechanism 64. The variable drive 65 for the belts causes the extruded tube 58 to be continuously pulled from the extrusion apparatus at a rate ranging from 15 to 50 times the normal extrusion rate to cause the cell elongation previously described. The pulling action of the belts also causes the tube 58 to be continuously pulled into the zone of operation of the cutting means, generally represented at 66. The cutting means includes both slicing and severing means which cooperate to sever short sliced tubular sections having the desired characteristics of the packing materials of the present invention.

In a schematic representation of the apparatus shown in FIGS. 6 and 7, the slicing means is in the form of a rotor 68 carrying peripherally spaced slicing knives 70. The severing means similarly comprises a rotor 72 carrying peripherally spaced serving knives 74. The severing knives 74 are sufficiently long to sever short tubular sections from the elongate tube 58, as the latter is forced through the tube guides 76 mounted on either side of the cutting zone 66 located midway between the rotors 68 and 72. The slicing knives 70 are likewise controlled as to length, and function at approximately timed intervals to slice part way through the tube 58 as it is held between the guides 76 on either side of the cutting zone. In general, the slicing knives 70 rotate in phased relation with respect to the severing knives 74 to produce sequentially alternating slicing and severing cuts in the tube 58. This phased relationship is accomplished in the illustrated apparatus by a direct drive from the power source 86, through the belt drives 88 and 90. As will be apparent from FIG. 2, the belt drive 90 is reeved about drive pulleys for each of the rotors 68 and 72 causing these rotors to rotate in opposite directions to move the slicing and severing knives 70, 74 through the cutting zone 66 in the same direction. The net effect of the described slicing and severing operation is to partially slice and sever the tuve 58 in stages, to produce peripherally bonded cylindrical tube portions which characterize the packing units of the present invention. Thus, as represented in FIGS. 1 and 8, the annular tube portions 212 of the packing units 210 are secured to one another at the unsliced, peripheral portions 214 of the tube walls.

FIG. 3 represents a variation in the processing and apparatus to produce tubular sections having wedge-shaped openings, wherein a single rotor 190 carries a series of slicing knives 192 positioned between severing knives 194. As illustrated, the slicing knives may be spaced between the severing knives so that rotation of the rotor effects sequential slicing and severing cuts to produce units having slicing cuts 196 appropriately spaced between the severing cuts 198. As particularly illustrated in FIG. 3, the spacing between tthe slicing knives 192 is greater than the spacing between the slicing knives 192 and the severing knives 194. The net effect is to produce slicing cuts 198 which are spaced a substantially greater distance from one another than they are from the severing cuts 198. As a result, the packing units 180 produced by the processing of FIGS. 3 and 4 comprise pairs of relatively thin annular portions 182 secured to a relatively thick central annular portion 184 along a common portion of the tube wall represented at 186. Upon subsequent expansion of the packing units, as hereinafter described, the relatively thin annular portions 182 expand and curl outwardly from the central annular portion 184 to produce packing units which generally resemble the previously described "fleur de lis," in side elevation. The shape of the resulting packing units not only presents oppositely facing wedge-shaped openings 40 which are unusually effective in producing the desired interlocking effect, but as the units can be generally circumscribed within a sphere, a mass of the units 180 is also characterized by an unusual resistance to "settling" during transit.

It may be noted that instead of a single rotor, as in FIG. 3, the cutting means 66 can employ two or more rotors, as in FIG. 2, to achieve the same result. Thus, the slicing and severing knives 70 and 74 of FIG. 2 can be positioned at appropriately spaced points on the separate rotors 68 and 72, without affecting any change in the processing. Alternatively, the slicing and severing knives can be placed in a row on the periphery of a single rotor, parallel to the axis of the rotor, so that the slicing and severing cuts can be made similtaneously at each rotation of the cutting means 66. As will be apparent from the foregoing, these and other variations are clearly within the scope of the present invention.

Figure 11:
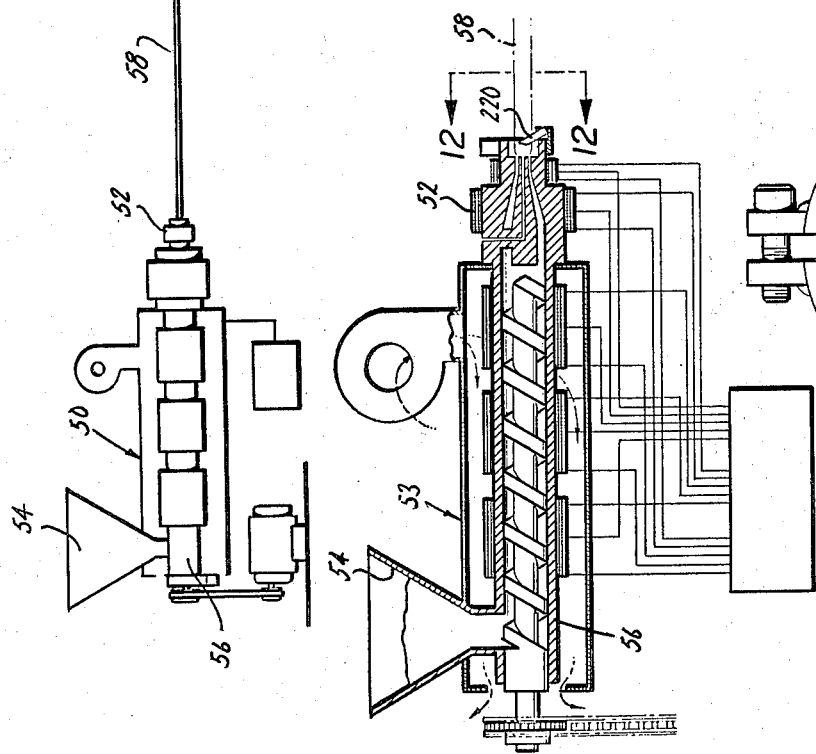
FIG. 11 is a schematic representation, enlarged in part, illustrating a modified system of apparatus for carrying out the method of invention, and to produce the packing material of FIG. 10.
Figure 12:
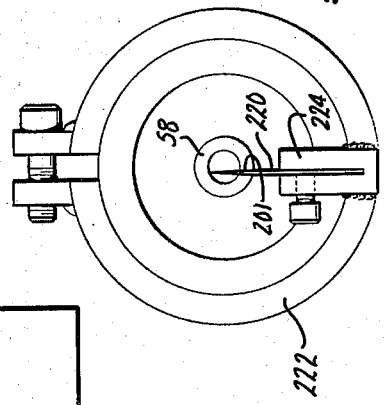
FIG. 12 is an enlarged sectional view of the apparatus of FIG. 11, along the line 11—11 thereof.

FIGS. 11 and 12 illustrate a further variation in the cutting and slicing apparatus to effect a longitudinal slicing cut 201, which is parallel to but slightly offset from the longitudinal axis of the extruded tube 56. This longitudinal slicing cut is made by a longitudinally oriented slicing knife 220 which may be placed in the path of the freshly extruded tube 58, as illustrated in FIG. 12. Alternatively, the slicing knife 220 may be positioned between the pulling mechanism 64 and the cutting device 66. Suitable means such as the ring clamp 222 and knife support 224, may be provided to properly position the knife 220 in either of these positions.

As illustrated in FIGS. 19–22, the effect of slightly offsetting the longitudinal cut 201 is to initiate a transverse wedging on expansion, which tends to move the tube portion 214 inwardly against the frictional resistance inherently present along the cut. Upon subsequent expansion of the individual units, for example, as severed by the knife 194 in FIG. 13, the tube portion 214 continues to slide and curl inwardly to form an inner annular core portion which is surrounded by an outer annular core portion 216. In this final expanded form of the packing units, shown in FIG. 22, the separate annular portions 214 and 216 provide a spring-like resilience on either side of annular core portion 218. The ultimate form of these packing units is also represented in FIGS. 10, 18 and 23. As will be apparent from these figures, both the thin curled annular portions 212 and the inner and outer curled portions 214 and 216 are peripherally joined or bonded to one another and to the central core portion 218 at the zone generally in the area of the reference numeral 214.

In general, it may be observed that the freshly cut packing units, illustrated for example in FIGS. 4, 5, 14, 15, and 19 tend to progressively expand with time to form the more characteristic shapes represented, respectively, in FIGS. 1 and 8, 10, 18, 22 and 23. As hereinafter explained, this progressive expansion occurs normally with the resins, nucleating and expanding agents customarily employed in the practice of the present invention.

As noted previously, thermoplastic resins capable of being formed and expanded to produce the crushable packing unit shapes herein disclosed include the alkenyl aromatic polymers (e.g., foamed and expanded polystyrene) and the aliphatic olefin polymers (e.g., foamed and expanded polyethlene, polybutylene, etc.). The first group of polymers, namely, resinous alkenyl aromatic polymers of the type disclosed for example in U.S. Pat. No. 3,066,382, generally comprise in chemically combined form at least 70 percent by weight of one alkenyl aromatic compound having the general formula:

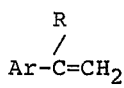

wherein Ar represents an aromatic hydrocarbon or a nuclear halohydrocarbon radical of the benzene series and R is hydrogen or the methyl radical. Examples of such alkenyl aromatic polymers are homopolymers of styrene, alphamethyl styrene, ortho-, meta-, and para-methyl styrene, ar-ethylstyrene, and ar-chlorostyrene, the copolymers of two or more of such alkenyl aromatic compounds with one another, and copolymers of one or more of such alkenyl aromatic compounds with minor amounts of other readily polymerizable olefinic compounds such as divinylbenzene, methylmethacrylate, or acrylonitrile, etc.

Foaming agents incorporated with the thermoplastic resins are usually gases or volatile liquids such as pentane, dichlorodifluoromethane, low boiling petroleum ethers and mixtures thereof, carbon dioxide and the like, which have been dissolved or otherwise incorporated within the thermoplastic polymer or resinous material. The usual practice is to incorporate the foaming agent as a uniform dispersion distributed throughout the resin, and in amounts sufficient to provide a very porous foam which will have the desired characteristic of crushability. In practice, the proportion of foaming agent will vary somewhat with the particular resin employed. In the case of a polystyrene resin employing a dissolved sodium bicarbonate or dichlorodluoromethane expanding agent, the proportion of expanding agent may range from about 5 to 15 percent by weight of the extrusion mixture. The extrusion mixture can also incorporate commercially available extrusion components, for example polystyrene beads, of the type disclosed in U.S. Pat. No. 2,983,692, and sold by the Koppers Co. of Delaware, under the trademark DYLITE. Such extrusion materials customarily contain from 5 to 10 percent by weight of a volatile organic material such as pentane or dichloro-difluoromethane dissolved in the polymer under pressure. Various expanding agents in solid form, such as sodium bicarbonate, may also be incorporated with the extrusion mixture to insure the necessary expansion and foaming of the mixture during extrusion to achieve the foam characteristics herein described. In general, a degree of foaming sufficient to achieve a density of the foamed and expanded plastic material of the order of 0.3 to about 4.5 pounds per cubic foot, and a bulk density of a relatively compact mass of the packing units ranging from about 0.05 to about b 3.0 pounds per cubic foot, is preferred.

When the plastic material employed is a resinous aliphatic olefin polymer of the type disclosed in U.S. Pat. No. 3,251,728, the polymer may be obtained by polymerizing at least one alpha-mono-olefinic aliphatic hydrocarbon containing from 2 to 8 carbon atoms, such as ethylene, propylene, butene-1, pentene-1, 3-methylhebutene-, 4-methylpentene-1, 4-methylhexene-1, or 5-methylhexene-1, alone, with one another or with various other polymerizable compounds. Foamed expanded polymers of ethylene or propylene along are highly satisfactory and produce desired foam structures which are chemically inert. Polymerizable organic compounds which can be polymerized with ethylene or propylene include vinyl acetate, $C_1$–$C_4$ alkyl acrylates such as ethyl acrylate, styrene, lower alkyl esters of methacrylic acid such as methyl methacrylate, tetrafluoroethylene and acrylonitrile.

Foaming or expanding agents employed with the aliphatic olefin polymers of the type described may be selected from a wide group or normally gaseous or volatile liquids. Indicated expanding and foaming agents include nitrogen, argon, neon, helium, acetylene, ammonia, butadiene, carbon dioxide, cyclopropane, dimethylamine, 2,2-dimethylpropane, ethane, ethylamine, ethylene, isobutane, isobutylene, monomethylamine, propane, propylene, and trimethylamine, certain of the halogen derivatives of methane and ethane, such as chlorodifluoromethane, dichlorodifluoromethane, dichlorofluoromethane, trichlorofluoromethane, difluorotetrachlorethane, difluorochloroethane, 1,1-dichlorotetrafluoroethane and 1,2-dichlorotetrafluoroethane. The dichlorotetrafluoroethanes have been found to be particularly effective as foaming agents for making foamed bodies from normally solid aliphatic olefin polymers when employed in accordance with the present invention in amounts of about 0.2 to 1.0 percent by weight of the aliphatic olefin polymers. The precise amount of expanding or foaming agent employed will depend in large measure on the particular aliphatic olefin polymer used in the extrusion process. The conditions of foaming should be controlled as before, to achieve a desired density of the expanded foamed polymer between about 0.3 and 4.5 pounds per cubic foot, and a bulk density of the compacted packing mass ranging from about 0.05 to 3.0 pounds per cubic foot. In general, among the aliphatic olefin polymers, foamed expanded polyethylene and polypropylene resins based on initial resins of molecular weight 250 to 400,000 are to be preferred.

Preferred processing to produce the packing units of the present invention involves extruding a hollow thermoplastic tube, stretching the heat-softened tube to longitudinally orient the cells within the tube walls, cooling and setting the tube, and cutting the tube to slice and sever individual packing units having outwardly facing wedge-shaped openings. Sliced severed units produced by such processing are generally represented in FIGS. 4, 5, 14, 15, and 19, at a stage prior to a normal expansion which customarily occurs in the ambient atmosphere. The apparatus schematically represented in FIG. 2 illustrates further processing to radially expand the packing units to produce the foamed expanded and curled packing units possessing enhanced characteristics of crushability and shock absorption, as herein particularly described. The processing to radially expand the longitudinally oriented gas cells in the tube walls is described in detail in copending application Ser. No. 765,083, referred to above. This expansion method generally involves the successive steps of heating the severed units in the presence of atmospheric steam or other gas at elevated temperature to expand the longitudinally stretched gas cells primarily in a radial direction. Thereafter, the expanded units are held for a period of time to allow equalization of internal gas pressures with ambient pressures, and the expansion procedure is repeated by successive heating and holding steps as necessary to obtain a desired degree of radial expansion of the individual units.

As schematically illustrated in FIG. 2, the tube 58 extruded from the extrusion apparatus 50 is pulled and forced through the cutting device 66 by the endless belts 62 or the pulling mechanism 64. Individual packing units sliced and severed at the cutting device 66 fall onto a first set of conveyers 140 where they are subjected to continued cooling and aging, during which gas pressures and temperatures within the cellurlar structure of the foam are equalized with that of the ambient atmosphere. In a typical operation, the severed units are held for approximately four hours on the belt conveyors 140 (or in bins), following which they are passed to the conveyor 142 of a first expansion unit 144, wherein they are subjected to the action of atmospheric steam at about 210°F, for a period of the order of 60 seconds. The product 148 issuing from this first expansion unit is then fed continuously to a second set of holding conveyers 150, and again subject to aging or holding at atmospheric conditions for a period of approximately four hours (again to permit the outside air to penetrate the cells and to relieve the partial vacuum created by the cooling). Thereafter, the cooled equalized units at 152 are fed to a second stage expansion unit 154 where they are again subjected to atmospheric steam at about 210°F for an additional 60 seconds. The twice expanded product issuing at 156 is generally represented by the form of the packing units illustrated in FIGS. 1 to 5. If desired the twice expanded products (following ccooling and aging on the conveyers 158 to achieve equalized conditions) may be fed to a third stage expander and thereafter again cooled to ambient conditions. In either event, the expanded product can be suitably packaged for shipment to the customer in polyethylene bags or other packaging, represented schematically at 160 in FIG. 2.

It is a particular feature of the invention that the expanded foam structure at the peripheral point of juncture or bonding of the outward curling annular portions with the annular core portion of the packing units (viz., at the apex of the wedge-shaped openings 40) is sufficiently rigid to prevent articulation between such annular portions. This structure is essential to preserve the integral unity of the packing units to provide the desired free-flowing characteristic. As a practical matter, due to the fact that the expansion processing provides a degree of expansion that is substantially greater in a radial direction than in an axial direction with reference to the axis of the tube 58, forces are generated in the foam structure which provides an enhanced degree of resistance to breaking forces exerted in such axial direction, as opposed to the radial direction. More specifically, at the particular point of juncture of the core and adjacent curled annular portions, represented at 186 in FIG. 8 and 214 in FIGS. 18 and 22, the foam structure is characterized by an enchanced resistance to tearing or breaking such as would permit the curled annular portions 182 or 212 to separate from the annular curled portion 184 or 218, respectively. This structural strength is important in the packing units because it imparts an enhanced degree of strength at the point of interlocking of the units, in a packing mass, to prevent premature failure of the units through separation of the curled annular units from the core. As a consequence, the mass of packing units is able to impart a maximum degree of resistance to migration of a packed item in the presence of continuing vibration or shock. Stated in another way, the enchanced strength of the foam structure in an axial dimension at the point of juncture provides a sufficient degree of rigidity in the foam to prevent articulation between the curled annular segments and the central annular segment. Specifically, as respects FIG. 8, articulation between the curled annular segments 182 and the core 184 is resisted by the relatively stronger foam structureinthe area 186.

Multiple expansion of the packing units, with particular reference to the type of packing unit illustrated in FIG. 1, is schematically represented in FIGS. 5 through 9. Thus, FIG. 5 represents sliced severing packing units as delivered directly from the cutting device 66. FIG. 6 illustrates a normal degree of expansion which might be achieved without deliberate heat expansion of the units, for example on the aging conveyers 140 in FIG. 2. FIG. 7 illustrates the product as obtained, for example, from the first stage expansion and cooling and aging on the conveyers 150. In like fashion, FIGS. 8 and 9 illustrates the product as might be obtained from a second stage expansion and cooling and aging steps on the conveyers 156. The packing units shown in FIGS. 8 and 9 thus represent the type of material being packaged at 158 in FIG. 2. As noted previously, the packing material is characterized in side elevation by a distinctive "fleur de lis" configuration, and in end elevation by a configuration similar to the Greek letter θ.

FIGS. 15 to 23 illustrate, in similar fashion, various stages in the expansion of units of the type illustrated in FIG. 10. Thus, FIGS. 15 and 19 represent sliced severed units as obtained in FIG. 14 whereas FIGS. 16 and 20 illustrate the same units subsequent to normal expansion, as might be obtained on the cooling and aging conveyers 140. FIGS. 5, 17 and 21 similarly represent the product of a first stage expansion, obtained from the cooling and aging conveyers 150. This particular embodiment of the packing units is similarly characterized in side elevation by a "fleur de lis" configuration, whereas end views of this product resemble the number 9. Further variations of the product form (in the normal or fully heat expanded form) may be produced for shipment to the consumer. Where the product is substantially unexpanded or partially expanded, the product may be shipped in such form that the consumer, and upon their being subjected to expansion processing as herein described, can be immediately used in packaging operations to facilitate further expansion of the units within the shipping cartons themselves. Such expansion, which may continue for periods up to twelve hours (to increase the volume of the packing material 20 percent or more), serves to immovably position the packed item within the shipping carton, and by virtue of the interlocking between the individual units, to resist and prevent and tendency of migration of the packed item through the packing mass during subsequent shipping and handling.

As noted, FIGS. 5 to 9 and 15 to 23 generally illustrate the stages in the multiple expansions of the packing units to achieve the characteristic "fleur de lis" configuration of the packing material particularly shown in FIGS. 8 and 18. Thus, FIG. 8 represents an individual sliced severed packing unit 180 characterized by thin annular portions 182 secured adjacent the relatively thicker annular core or central portion 184. FIGS. 5 to 8 represent successive stages in the expansion of the units 180 to achieve a desired outward radial expansion of the central portion 184 and a simultaneous outward radial expansion and curling of the thinner annular sections 182. The result of the successive expansion stages is to obtain a generally equidistant radial spacing of the outermost portions of each of the annular portions 182, 184 and 186 from the geometric center of the packing unit. This spaced relation of the individual parts of the packing unit is represented in FIGS. 8 and 9 by the dotted line 200 which represents an imaginary sphere circumscribing the packing unit. It will be appreciated that the most ideal physical configuration of a packing unit to provide minimum settling is a sphere, since no matter how a sphere might be oriented relative to each adjacent sphere, no reduction in volume of the mass of spheres would occur. Accordingly, the packing units 180 come close to providing the ideal configuration in a product which is crushable, essentially hollow, and which also provides outwardly facing wedge-shaped openings 40 adapted to interlocking contacts with other like units in a packing mass. Accordingly, the mass of packing units 180 not only serves to immovably position the packed item within the shipping carton but also functions to achieve substantially the maximum density of the packing mass during the initial packing operation, thereby avoiding the problem of "settling" and development of head space adjacent the top of the packing container. This desired characteristic is achieved in the packing units 180 by the warping or curling of the annular portions 182 so that the dimension between the outside edges of the portions 182 is substantially equivalent to the radially expanded diameter of the units 180.

FIGS. 15 to 18, and the corresponding end views of FIGS. 19 to 22, similarly illustrate stages in the expansion of units of the type illustrated, for example, at 210 in FIG. 10. Thus, the final products discharged from the conveyers 158 of FIG. 2 are further characterized by a generally curled configuration in end elevation which resembles the number 9 (see FIGS. 19 to 22). This configuration results from the offset slicing cut 201 which initiates oppositely directed curling movements of the separate portions 214 and 216. This is oppositely directed curling movement continues in exaggerated fashion on subsequent expansion to produce final configurations as shown in FIGS. 18, 22 and 23. The resulting packing units have a coiled spring characteristic which is highly effective in a product which is otherwise essentially hollow and crushable. The described configuration also provides additional outwardly facing wedge-shaped openings, as at 40 in FIG. 22, which achieve interlocking contacts with other like units in the packing mass.

From the above description it will be evident that the present invention makes possible the production of highly effective, efficient packing materials, particularly adapted to the packing of items and components of electronic and optical equipment, for example, timers, meters, binoculars, lenses, radio tubes, etc. as well as various other items. The improved packing materials have proved effective in the packing of items of delicate nature which can be rendered useless because of a change of position, alignment or adjustment of the parts. Under normal shipping conditions, such changes can occur due to constant vibration of the item against the wall of the container without any visible breakage occurring. Because the interlocking characteristic of the packing material of the present invention virtually eliminates migration of a packed item, while similtaneously providing an unusually high degree of shock absorbing characteristics, its utility for shipments involving continued vibration, difficult shipping conditions or very rough handling, is readily apparent.

We Claim:

1. A free flow, interlocking packing material of low bulk density, particularly adapted to providing maximum absorption of shock while preventing migration of relatively heavy packed items therethrough, comprising a plurality of individual packing units formed of a foamed substantially rigid expanded plastic material possessing sufficient internal strength to be self-sustaining under normal handling but capable of substantial crushing in response to external force, each of said individual packing units consisting of a central substantially cylindrical annular portion and two outwardly curling annular portions substantially permanently secured to said central portion and to one another at a peripheral portion thereof, said portions being characterized by a foam structure which has been expanded substantially greater in a radial direction than in an exial direction so as to provide enlarged wedge-shaped openings between said portions, the foam structure of said packing units at said peripheral portion being relatively stronger in the axial direction and being sufficiently rigid to prevent articulation between said outwardly curling portions and said central substantially cylindrical portion.

2. A packing material as in claim 1 wherein said central annular portion is substantially in the form of a right cylinder, and said outwardly curling annular portions have a dimension along the axis thereof, between the outer edges of said curled portions substantially equal to the outer diameter of said central cylindrical portion.

3. A packing material as in claim 1 wherein said individual packing units are initially cut from an elongate tubular length of foamed expanded plastic which is partially cut through to provide adjacent, peripherally bonded substantially cylindrical portions.

4. A packing material as in claim 3 wherein said substantially cylindrical portions are secured to one another in a zone of longitudinally stretched foamed plastic which, on subsequent expanding, provides the foamed structure with said characteristic of being relatively stronger in the axial direction while being sufficiently rigid to prevent articulation of said outwardly curled annular portions.

5. As an article of manufacture, a shipping carton for frangible items, such carton being substantially completely filled with a packing mass comprised of a plurality of individual packing units formed of a foamed substantially rigid expanded plastic material, said plastic material possessing sufficient internal strength to be self-sustaining under normal handling but capable of substantial crushing in response to external force, each of said individual packing units consisting of a central substantially cylindrical annular portion and two outwardly curling annular portions substantially permanently secured to said central portion and to one another at a peripheral portion thereof, said portions being characterized by a foam structure which has been expanded substantially greater in a radial direction than in an axial direction so as to provide enlarged wedge-shaped openings between said portions, the foam structure of said packing units at said peripheral portion being relatively stronger in the axial direction and sufficiently rigid to prevent articulation between said outwardly curling portion and said central substantially cylindrical portion, the positioning of said annular portions providing wedge-shaped openings adapted to interlock with at least one of the other said individual packing units, said interlocking extending throughout the said packing mass to cooperatively prevent migration of an article packed therein, said respective curling and cylindrical annular portions presenting a shape configuration wherein outermost portions thereof are substantially equidistant from the geometric centers of said individual packing units.

6. In a method for the continuous manufacture of free flow, interlocking foamed expanded plastic packing materials of generally cylindrical cross-section, the continuous steps of heating an expandable plastic foam material to form a semisolid extrusion mass characterized by the presence of internal gas cells, extruding the heat-softened mass along an extrusion axis to form a heat-softened tube, lengthening said heat-softened tube to longitudinally stretch the gas cells therein, cooling said tube to a set stage, continuously slicing into and through said tube to form and sever individual plastic units having two outer substantially cylindrical portions substantially permanently secured to a central cylindrical portion and to one another at a peripheral portion thereof, and thereafter heating said severed plastic units to expand the longitudinally stretched gas cells in said cylindrical portions so that the central portion expands substantially radially to form a radially expanded annular core and said outer portions expand and curl in both radial and axial directions to form radially expanded outwardly curling annular portions, whereby outer edges of said annular portions are substantially equidistant from the geometric centers of the expanded packing units.

7. A method as in claim 6 wherein said individual plastic units are severed and sliced in a simultaneous operation involving the concurrent movement of severing and slicing means through said tube.

8. A method as in claim 6 wherein said individual plastic units are severed and sliced in successive operations involving progressive and successive movement of slicing and severing means through said tube.

9. A method as in claim 8 wherein each severing operation is followed by at least two slicing operations, the time between adjacent slicing operations being greater than the time between adjacent severing and slicing operations.

10. A method as in claim 6 wherein said slicing means contact said tube in such fashion to form a longitudinal cut substantially parallel to the axis of the tube, followed by contact with said severing means.

11. A method for the continuous manufacture of free flow, interlocking packing materials of low bulk density, comprising continuously feeding an extrusion mass composed of heat softenable plastic material together with foaming and nucleating agents to an extrusion zone, continuously heating said extrusion mass and extruding the same in the form of a hollow heat-softened tube, said heat-softened tube being subject to cooling in an ambient atmosphere to a set stage, continuously frictionally engaging set portions of the extruded tube to pull the same away from the extrusion zone to thereby longitudinally stretch and to maintain the freshly extruded material in a desired hollow tube configuration, such longitudinal stretching serving to longitudinally orient gas cells formed in the walls of the tube during the extruding, continuously cooling the extruded tube in an ambient atmosphere to a set stage, continuously slicing and cutting the set tube to form severed tube sections having a central hollow annular core and two adjacent substantially hollow annular tube portions, and thereafter heating the severed tube sections to expand the longitudinally oriented cells to effect a substantially radial expansion of the central core and a combined radial and axial expansion of the adjacent portions, said combined radial and axial expansion occurring as a result of outward curling expansion of said adgancet annular portions.

12. A method as in claim 11 wherein the continuous slicing and cutting operations thereby effect internal curling of said central core upon itself, in substantially the same plane.

13. A method as in claim 11 wherein the continuous slicing and cutting operations are timed to producee a relatively thick annular central portion and relatively thin adjacent annular portions on either side thereof, to thereby facilitate said outward curling expansion.

14. A method as in claim 11 wherein initially expanded sliced tubular sections are cooled and held for a period of time sufficient to permit equalization with ambient temperatures and pressures, following which the expanded severed sections are again heated to expand the same and to thereby further enlarge the dimension of the severed tubular sections.

* * * * *

UNITED STATES PATENT OFFICE
CERTIFICATE OF CORRECTION

PATENT NO. : 3,896,934
DATED : July 29, 1975
INVENTOR(S) : Arthur Graham et al

It is certified that error appears in the above-identified patent and that said Letters Patent are hereby corrected as shown below:

Claim 1, column 13, line 5, "exial" should be --axial--.

Claim 11, column 14, last line, "adgancet" should be --adjacent--.

Claim 13, column 15, line 2, "producee" should be --produce--.

Signed and Sealed this sixteenth Day of December 1975

[SEAL]

Attest:

RUTH C. MASON
Attesting Officer

C. MARSHALL DANN
Commissioner of Patents and Trademarks